(12) United States Patent
Yajima et al.

(10) Patent No.: US 7,819,944 B2
(45) Date of Patent: Oct. 26, 2010

(54) METHOD OF DEHYDRATION, DEHYDRATING APPARATUS, AND MEMBRANE REACTOR

(75) Inventors: Kenji Yajima, Nagoya (JP); Kunio Nakayama, Okazaki (JP); Makiko Niino, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/204,994

(22) Filed: Sep. 5, 2008

(65) Prior Publication Data
US 2009/0007780 A1    Jan. 8, 2009

Related U.S. Application Data

(63) Continuation of application No. PCT/JP2007/052788, filed on Feb. 15, 2007.

(30) Foreign Application Priority Data

Mar. 14, 2006   (JP)  ............................. 2006-069376

(51) Int. Cl.
*B01D 53/22*     (2006.01)
*B01D 71/02*     (2006.01)

(52) U.S. Cl. ............................. 95/52; 96/4; 96/7; 96/10; 96/11; 210/640; 210/500.21; 210/500.22; 55/523; 422/212; 422/222

(58) Field of Classification Search ...................... 96/4, 96/7, 10, 11; 95/45, 50, 51, 52, 54, 55; 210/640, 210/641, 500.21, 500.22; 55/523, 524; 422/212, 422/222

See application file for complete search history.

(56) References Cited

U.S. PATENT DOCUMENTS

| | | | | |
|---|---|---|---|---|
| 5,554,286 A | * | 9/1996 | Okamoto et al. | ....... 210/500.25 |
| 6,001,257 A | * | 12/1999 | Bratton et al. | ............... 210/640 |
| 6,340,433 B1 | * | 1/2002 | Kuznicki et al. | ............... 95/52 |

(Continued)

FOREIGN PATENT DOCUMENTS

JP     2711845 B2    10/1997

(Continued)

OTHER PUBLICATIONS

Laura Casado, et al., "*Preparation, characterization and pervaporation performance of mordenite membranes*," Journal of Membrane Science, No. 216 (2003), pp. 135-147.

(Continued)

*Primary Examiner*—Jason M Greene
(74) *Attorney, Agent, or Firm*—Burr & Brown (57) ABSTRACT

A dehydration method by which water is selectively separated from a water-containing mixture 31 with a separation membrane. The separation membrane is a DDR type zeolite membrane 2. The dehydration method includes bringing the mixture 31 into contact with one side of the DDR type zeolite membrane 2 and causing a pressure difference between that side of the DDR type zeolite membrane 2 which is in contact with the mixture and the other side of the DDR type zeolite membrane 2 to thereby cause the water to selectively permeate and separate out. By the dehydration method, water can be selectively separated from a water-containing mixture without the need of a high energy cost. The separation membrane has excellent acid resistance.

6 Claims, 2 Drawing Sheets

U.S. PATENT DOCUMENTS

| | | | |
|---|---|---|---|
| 6,387,269 B1* | 5/2002 | Eltner et al. | 210/640 |
| 6,503,294 B2* | 1/2003 | Yoshikawa et al. | 95/45 |
| 6,733,572 B2* | 5/2004 | Reyes et al. | 95/96 |
| 6,755,975 B2* | 6/2004 | Vane et al. | 95/45 |
| 7,276,105 B2* | 10/2007 | Pruet | 95/52 |
| 7,485,173 B1* | 2/2009 | Liu et al. | 95/45 |
| 2004/0173094 A1* | 9/2004 | Nakayama et al. | 95/45 |
| 2005/0184009 A1 | 8/2005 | Jansen et al. | |
| 2005/0229779 A1 | 10/2005 | Nakayama et al. | |
| 2008/0142440 A1* | 6/2008 | Liu et al. | 210/640 |

FOREIGN PATENT DOCUMENTS

| | | |
|---|---|---|
| JP | 2808479 B2 | 7/1998 |
| JP | 2004-105942 A1 | 4/2004 |
| JP | 2005-145955 A1 | 6/2005 |

OTHER PUBLICATIONS

Ying Cui, et al.,"*Zeolite T membrane: preparation, characterization, pervaporation of water/organic liquid mixtures and acid stability*," Journal of Membrane Science, No. 236 (2004), pp. 17-27.

Tadafumi Yamamura, et al., "*Development of Membrane Aided Reactor*," Mitsui Zosen Technical Review, No. 178, Feb. 2003, pp. 115-120.

* cited by examiner

METHOD OF DEHYDRATION, DEHYDRATING APPARATUS, AND MEMBRANE REACTOR

FIELD OF THE INVENTION

The present invention relates to a dehydration method, a dehydrating apparatus, and a membrane reactor, and more particularly, to a dehydration method and a dehydrating apparatus by which water can be selectively separated from a water-containing mixture without the need of a high energy cost, a separation membrane of which has excellent acid resistance, and a membrane reactor by which water can be selectively separated from a water-containing reactant, a separation membrane of which has excellent acid resistance.

BACKGROUND OF THE INVENTION

Conventionally, distillation has been mainly used as a method for separating water from water-containing mixture (dehydration). However, the separation method using the distillation needs high energy, and thus a separation method with low energy consumption has been proposed from the viewpoint of energy saving or the like.

For example, an organic membrane and an inorganic membrane are used as a separation membrane used in a dehydration method using membrane separation, but there is a case that they cannot be used depending on properties of mixed solution. For example, the organic membrane is poor in heat resistance and chemical resistance. A zeolite membrane or a silica membrane is used as the inorganic membrane, but A type zeolite membrane (e.g., see Non-Patent Document 1) among zeolite membranes is low in acid resistance and is not suitable for dehydration of acid solution. A T type zeolite membrane (e.g., see Non-Patent Document 2) or an MOR type zeolite membrane (e.g., see Non-Patent Document 3) is high in acid resistance as compared with the A type zeolite membrane, but the T type zeolite membrane does not have sufficient acid resistance yet. In contrast, the silica membrane (e.g., see Patent Document 1) is high in acid resistance, but new improvement of the silica membrane is desired from the viewpoint of separation performance.

Non-Patent Document 1: Development of Membrane Aided reactor, Mitsui Zosen Technical Review, February, 2003, No 178, 115-120

Non-Patent Document 2: Y. Cui et al., Zeolite T membrane: preparation, characterization, pervaporation of water/organic liquid mixtures and acid stability, Journal of Membrane Science, 2004, 236, 17-27

Non-Patent Document 3: L. Casado et al., Preparation, characterization and pervaporation performance of mordenite membranes, Journal of Membrane Science, 2003, 216, 135-147

Patent Document 1: Japanese Patent No. 2808479

SUMMARY OF THE INVENTION

As described above, in the dehydration method using the conventional separation membranes, it is difficult to separate water from acid solution with high separation efficiency.

The present invention has been made to solve the aforementioned problem, and an object of the invention is to provide a dehydration method and a dehydrating apparatus by which water can be selectively separated from a water-containing mixture without the need of a high energy cost, and the separation membrane of which has excellent acid resistance, and to provide a membrane reactor by which water can be selectively separated from a water-containing reactant, and the separation membrane of which has excellent acid resistance.

To achieve the aforementioned object, there are provided the following dehydration method, dehydrating apparatus, and membrane reactor according to the present invention.

[1] A dehydration method by which water is selectively separated from a water-containing mixture with a separation membrane that is a DDR type zeolite membrane, the dehydration method including: bringing the mixture into contact with one side of the DDR type zeolite membrane; and causing a pressure difference between one side (supply side space) of the DDR type zeolite membrane which is in contact with the mixture and the other side (permeation side space) of the DDR type zeolite membrane, to thereby cause the water to selectively permeate and separate out.

[2] The dehydration method according to the above [1], wherein the mixture is a liquid containing an organic compound.

[3] The dehydration method according to the above [1], wherein the mixture is a gas containing an organic compound.

[4] The dehydration method according to the above [1], wherein the mixture is a supercritical gas containing an organic compound.

[5] A dehydrating apparatus including: a separation container that includes a porous substrate, a DDR type zeolite membrane disposed on the surface of the porous substrate, and a container body defined into a space (supply side space) of one side of the DDR type zeolite membrane disposed on the surface of the porous substrate and a space (permeation side space) of the other side thereof; and at least one of a depressurizing device that depressurizes the permeation side space of the separation container and a pressurizing device that pressurizes the supply side space of the separation container.

[6] The dehydrating apparatus according to the above [5], further including a collector that collects materials permeating from the supply side space through the DDR type zeolite membrane to the permeation side space.

[7] A membrane reactor including: a reactor that includes a porous substrate, a DDR type zeolite membrane disposed on the surface of the porous substrate, and a reactor body defined into a space (reaction side space) of one side of the DDR type zeolite membrane disposed on the surface of the porous substrate and a space (permeation side space) of the other side thereof; and at least one of a depressurizing device that depressurizes the permeation side space of the reactor and a pressurizing device that pressurizes the reaction side space of the reactor.

[8] The membrane reactor according to the above [7], further including a collector that collects materials permeating from the reaction side space through the DDR type zeolite membrane to the permeation side space.

According to the dehydration method, water can be selectively separated from a mixture without the need of a high energy cost, only by bringing a water-containing mixture into contact with one side of a DDR type zeolite membrane and causing a pressure difference between one side of the DDR type zeolite membrane which is in contact with the mixture and the other side of the DDR type zeolite membrane. Since the DDR type zeolite membrane has excellent acid resistance, it is possible to efficiently separate water from an acidic mixture.

According to the dehydrating apparatus, water can be selectively separated from a mixture without the need of a high energy cost, since water is selectively permeated through a DDR type zeolite membrane when causing a pressure difference between a permeation side space and a supply side space by introducing a water-containing mixture to the supply side space. Since the DDR type zeolite membrane has excellent acid resistance, it is possible to separate water from an acidic mixture.

According to the membrane reactor, water can be selectively separated from a reactant without the need of a high energy cost, since water is selectively permeated through a DDR type zeolite membrane when causing a pressure difference between a permeation side space and a reaction side space by carrying out a predetermined reaction in the reaction side space. Since the DDR type zeolite membrane has excellent acid resistance, it is possible to separate water from an acidic reactant.

DESCRIPTION OF REFERENCE NUMERALS

1: separation container
2: DDR type zeolite membrane
3: container body
4: based cylindrical container
5: lid
6: inner cylinder (glass tube)
7: cooling tube
8: thermometer
9: stirrer
10: union
11: rubber stopper
12: heat medium container
13: cap
14: collector
15: depressurizing device
16: pipe for depressurizing
17: cold medium container
21: supply side space
22: permeation side space
31: mixture
32: membrane permeation material
33: heat medium
34: permeation direction
35: liquid nitrogen
47: porous substrate
50: gas separation tester
51: measurement tube
52: DDR type zeolite membrane
53: tube furnace
54: furnace tube
55: quartz tube
100: dehydration apparatus

DETAILED DESCRIPTION OF THE INVENTION

Hereinafter, the best mode for carrying out the invention will be described, but the present invention is not limited to the following embodiments. The present invention may be appropriately modified in design and improved in the scope of the concept of the present invention on the basis of the general knowledge of a person skilled in the art.

(1) Separation Method

A dehydration method of the present invention is to selectively separate water from a water-containing mixture (hereinafter, referred to as "mixture") with a separation membrane that is a DDR type zeolite membrane, and the dehydration method including: bringing the mixture into contact with one side of the DDR type zeolite membrane; and depressurizing the other side of the DDR type zeolite membrane, to thereby selectively permeate and separate water. That is, as the dehydration method using the separation membrane, water is selectively permeated through the separation membrane. In the present invention, it has been known that the DDR (Deca-Dodecasil 3R) type zeolite is a crystal mainly made of silica, pores thereof are formed by polyhedron including oxygen 8-membered ring, a pore diameter of the oxygen 8-membered ring is 4.4×3.6 angstrom (see W. M. Meier, D. H. Olson, Ch. Baerlocher, Atlas of zeolite structure types, Elsevier (1996)). Since the DDR type zeolite membrane is made mainly of silica (silica/alumina ratio (molar ratio) is about 200 or more), acid resistance thereof is excellent. With respect to acid resistance, the A type zeolite has low acid resistance since the content of alumina is high (silica/alumina ratio (molar ratio) is about 2). The T type zeolite has low acid resistance since a silica/alumina ratio (molar ratio) thereof is low as 6 to 8, although the content of silica is slightly high as compared with the A type zeolite. The MOR type zeolite has insufficient acid resistance since a silica/alumina ratio (molar ratio) is about 40 or less, although the content of silica is higher than that of the other type zeolite.

The DDR type zeolite having such structural characteristics has relatively small pore diameters among various types of zeolite, and may be used as a molecular sieve membrane of low molecular gas such as carbon dioxide ($CO_2$), methane ($CH_4$), and ethane ($C_2H_6$). On the contrary, in the present invention, the DDR type zeolite is formed into a membrane shape, and is used as a dehydration separation membrane for selectively separating water from a water-containing mixture. Herein, "selectively separating water" means that a solution or gas having a high water-containing ratio as compared with the composition of a mixture is separated and taken out as well as water with purity of 100% is separated and taken out from a mixture. In addition, "dehydration" means that water is selectively separated.

As described above, in the dehydration method of the present invention, since the DDR type zeolite membrane is used as the separation membrane, durability of the separation membrane, particularly acid resistance is excellent in the separation process even though the water-containing mixture is acid. The reason is that the DDR type zeolite membrane has the excellent acid resistance as described above. Accordingly, the DDR type zeolite membrane exhibits an excellent advantage in the case of dehydrating an acidic mixture. In addition, in the dehydration method of the present invention, since the DDR type zeolite membrane is used as the separation membrane, the separation performance is hardly affected depending on a hydrophilic or hydrophobic property of the membrane permeating material, and excellent separation performance is exhibited. The reason is that the DDR type zeolite membrane permeates water and hardly permeates a material having a large molecule size by the molecular sieve effect, irrespective of the hydrophilic or hydrophobic property of a material other than water, differently from the A type zeolite membrane or the like which selectively permeates water by a strong hydrophilic property.

The dehydration method of the present invention is to bring the mixture into contact with one side (supply side) of the DDR type zeolite membrane and cause a pressure difference between the other side (permeation side) of the DDR type zeolite membrane and the supply side. The pervaporation is used in which the permeation side is depressurized so that water permeates the DDR type zeolite membrane in the case that the mixture is supplied in a liquid state. The vapor permeation is used in which the supply side is pressurized or the permeation side is depressurized so that water permeates the DDR type zeolite membrane in the case that the mixture is supplied in a gas or supercritical gas state. Accordingly, it is possible to selectively separate water from the mixture without the need of a high energy cost. In the dehydration method of the present invention, in the case of using the pervaporation, water can be selectively separated without heating the mixture at a high temperature, and thus the energy cost is more advantageous as compared with the separation method using the distillation. On the other hand, in the dehydration method of the present invention, in the case of using the vapor permeation, the heating is necessary according to the state of supplied mixture. However, the heating process is performed in one stage, and the energy cost is advantageous as compared with the separation method using the general distillation in which the heating process is performed in multi stages. In the case that liquid is evaporated into a mixture, it is possible to suppress a bad effect on the membrane due to a component having a lower boiling point than water in liquid. Herein, the bad effect means fouling (clogging) or chemical reaction. In the case that the mixture is supplied as a high temperature gas (high temperature vapor) without the need of a heating process, there is no change in phase before and after the permeation of the DDR type zeolite membrane. Accordingly, decrease in temperature due to latent heat does not occur, and the energy cost is advantageous.

In the case of pervaporation, the pressure of one side (supply side) of the DDR type zeolite membrane is preferably the air pressure. The pressure of the other side (permeation side) of the DDR type zeolite membrane is preferably $8 \times 10^4$ Pa or lower, more preferably in the range of $1 \times 10^{-2}$ to $5 \times 10^4$ Pa, and particularly preferably in the range of $1 \times 10^{-1}$ to $1 \times 10^4$ Pa. The temperature of the mixture at the time of selectively separating water from the mixture by the pervaporation is preferably in the range of 20 to 100° C., and more preferably in the range of 20 to 80° C. As described above, since the separation of the mixture can be performed at the low temperature, it is possible to separate water without the use of high energy. When the temperature is higher than 100° C., the energy cost may increase. When the temperature is lower than 20° C., the separation rate may decrease. In the case of vapor permeation, the pressure of one side (supply side) of the DDR type zeolite membrane is preferably in the range of $1 \times 10^5$ to $2.5 \times 10^7$ Pa, and the pressure is preferably a higher temperature from the viewpoint of the separation rate. When the pressure difference between the supply side and the permeation side is $2.5 \times 10^7$ Pa or higher, the DDR type zeolite membrane may be damaged or the sealing of the seal portion may be deteriorated. The pressure of one side (permeation side) of the DDR type zeolite membrane may be lower than the pressure of the supply side, but preferably $8 \times 10^4$ Pa or lower, more preferably in the range of $1 \times 10^{-2}$ to $5 \times 10^4$ Pa, and particularly preferably in the range of $1 \times 10^{-1}$ to $1 \times 10^4$ Pa. The temperature of the mixture at the time of selectively separating water from the mixture by the vapor permeation is preferably 20° C. or higher, more preferably in the range of 100 to 400° C., and particularly preferably in the range of 100 to 200® C. from the viewpoint of energy cost. When the temperature is lower than 20° C., the separation rate may decreases. When the temperature is higher than 400° C., the membrane may be deteriorated.

The DDR type zeolite membrane is disposed preferably on the surface of the porous substrate. When the zeolite membrane is disposed on the surface of the porous substrate, the zeolite membrane is supported to the substrate even through the zeolite membrane is thin and the shape thereof is kept, thereby preventing the zeolite membrane from being damaged. The substrate is not limited particularly if the substrate is porous and can form a zeolite membrane. The material, shape, and size thereof may be appropriately determined according to the uses or the like.

In the dehydration method of the present invention, the mixture contains preferably an organic compound in addition to water. As the organic compound, there are alcohol, phenol, aldehyde, ketone, carboxylic acid, ether, ester, amine, nitryl, straight chain saturated hydrocarbon, branched saturated hydrocarbon, ring saturated hydrocarbon, chain unsaturated hydrocarbon, aromatic hydrocarbon, nitrogen-containing compound, sulfur-containing compound, halogen derivative of hydrocarbon, and the like. As alcohol, there are methanol, ethanol, isopropanol, and the like. As ketone, there are acetone, ethyl methyl ketone, and the like. As carboxylic acid, there are formic acid, acetic acid, butyric acid, propionic acid, and the like. As aromatic hydrocarbon, there are toluene, benzene, and the like. They may be contained as one kind or plural kinds.

(2) Dehydrating Apparatus

The above described dehydration method of the present invention is carried out preferably using a dehydrating apparatus of the present invention described as follows. The dehydrating apparatus of the present invention includes: a separation container that includes a porous substrate, a DDR type zeolite membrane disposed on the surface of the porous substrate, and a container body defined into a space (supply side space) of one side of the DDR type zeolite membrane disposed on the surface of the porous substrate and a space (permeation side space) of the other side thereof; and a depressurizing device that depressurizes the permeation side space of the separation container or a pressurizing device that pressurizes the supply side space of the reactor, or both of the depressurizing device and the pressurizing device. The dehydrating apparatus further includes preferably a collector that collects materials permeating from the supply side space through the DDR type zeolite membrane to the permeation side space. Hereinafter, the dehydrating apparatus of the present invention will be described.

(2-1) Separation Container

The separation container used in the dehydrating apparatus of the present invention includes a porous substrate, a DDR type zeolite membrane disposed on the surface of the porous substrate, and a container body defined into a space (supply side space) of one side of the DDR type zeolite membrane disposed on the surface of the porous substrate and a space (permeation side space) of the other side thereof, as described above. In the container body, the supply side space and the permeation side space are formed as described above, and the DDR type zeolite membrane is disposed at least at a part of boundary of these two spaces such that one side thereof faces the supply side space and the other side faces the permeation side space. When a mixture is put in the supply side space, it is preferable that the whole one side of the DDR type zeolite membrane is in contact with the mixture. Until the separation process is completed, it is preferable to keep the state where the whole one side of the DDR type zeolite membrane is in contact with the mixture.

Figure 1:
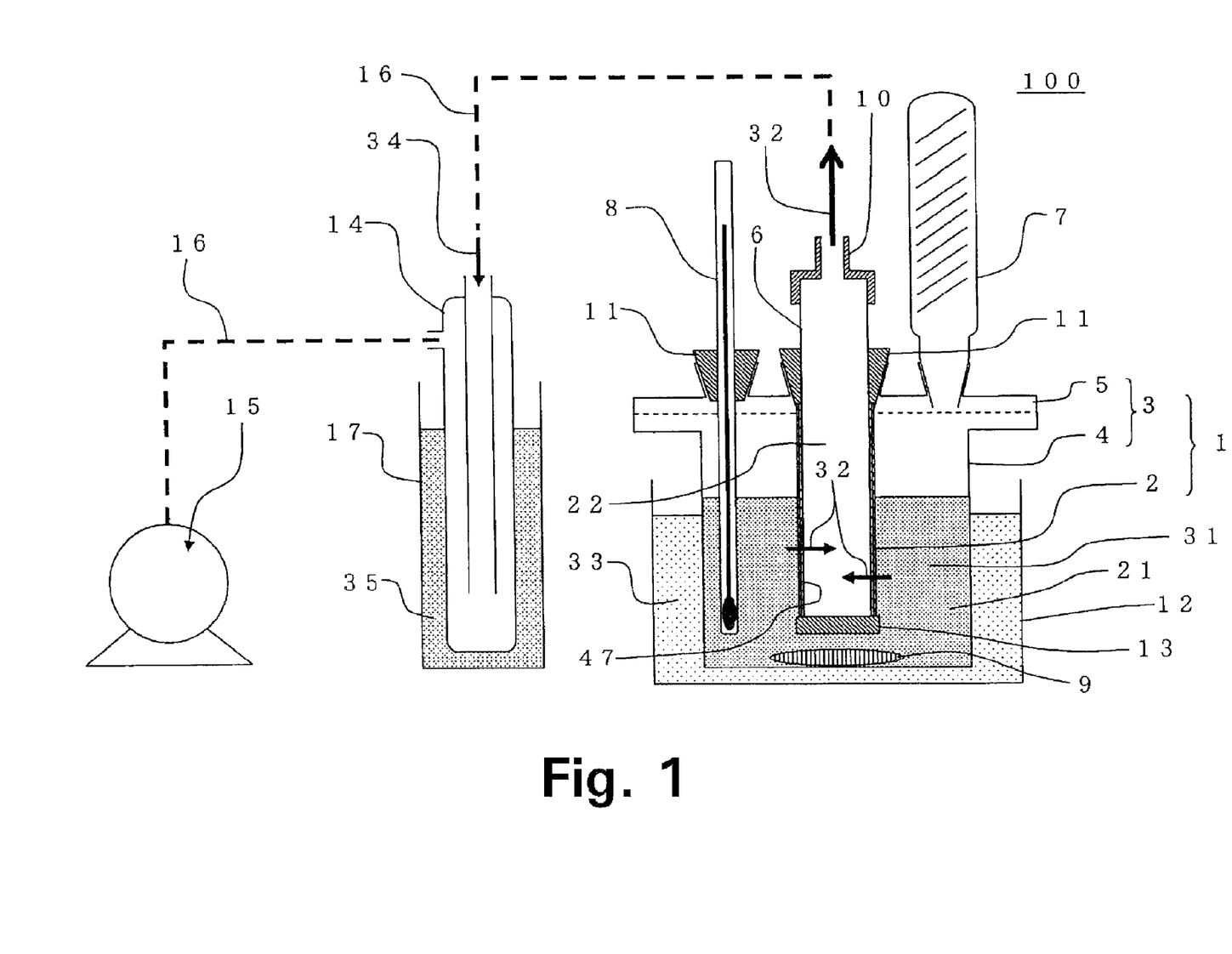
FIG. 1 is a schematic diagram illustrating an embodiment of a dehydration apparatus of the present invention.

The structure of the separation container is not limited particularly as long as the conditions are satisfied, and any structure may be used. For example, as shown in FIG. 1, a separation container 1 constituting a separation apparatus 100 may include a container body 3 and a porous substrate 47 on which a DDR type zeolite membrane 2 is formed. The container body 3 may include a based cylindrical container 4 having an opening closed by a lid 5, a thermometer 8 that is inserted into the based cylindrical container 4 through the lid 5, and a cylindrical inner cylinder 6, and a cooling tube 7. The porous substrate 47 having the DDR type zeolite membrane 2 formed thereon is adhered to an end of the inner cylinder 6 on the side where the inner cylinder 6 is inserted into the based cylindrical container 4. The other end that is not adhered to the inner cylinder 6 in the porous substrate 47 having the DDR type zeolite membrane 2 formed thereon is closed by an inner cylinder bottom 13. The material and shape of the inner cylinder bottom 13 are not limited particularly, and may be appropriately determined according to properties of a mixture. A glass tube or a stainless tube may be used as the cylindrical inner cylinder 6. In this case, a space that is the inside of the based cylindrical container 4 and the outside of the inner cylinder 6 is a supply side space 21, and a space that is the inside of the inner cylinder 6 is a permeation side space 22.

With such a structure of the separation container 1, a mixture 31 is put in the supply side space 21 and comes into contact with one side of the DDR type zeolite membrane 2, and the space (permeation side space 22) in the porous substrate 47 is depressurized, to thereby collect membrane permeating materials 32 coming from the supply side space 21 through the DDR type zeolite membrane 2 to the space (permeation side space 22) in the porous substrate 47. The membrane permeating materials 32 are water or water-concentrated liquid or gas. When the inside of the porous substrate 47 is depressurized through a collector (trap) by a depressurizing device, the membrane permeating materials 32 flows out from the inner cylinder 6 through a depressurizing pipe to the outside and the membrane permeating materials 32 are collected by the collector.

In FIG. 1, the thermometer 8 and the inner cylinder 6 pass through a rubber stopper 11 and are fixed to the lid 5 with the rubber stopper 11 interposed therebetween. The separation container 1 is put in a heat medium container 12 filled with a heat medium 33 so that the mixture 31 is heated by the heat medium 33. The mixture 31 is formed to be stirred by a stirrer 9. The heated gas in the separation container 1 is cooled by a cooling tube 7.

As shown in FIG. 1, an end (not coming into contact with the mixture) of the inner cylinder 6 on the side where the porous substrate 47 having the zeolite membrane 2 formed thereon is not disposed is connected to the depressurizing pipe 16 by a union 10. The depressurizing pipe 16 is connected to the collector (trap) 14, and the depressurizing pipe 16 is connected from the collector 14 to a depressurizing device 15. Accordingly, the inside (permeation side space 22) of the inner cylinder 6 is depressurized by suction through the union 10 by the depressurizing device 15 in a permeating direction 34.

The material of the container body 3 and the cooling tube 7 are not limited particularly, and may be appropriately determined according to properties of a mixture. For example, in the case that the mixture contains acid, they may be made of glass, stainless, or the like.

The DDR type zeolite membrane constituting the separation container used in the dehydrating apparatus of the present invention has a thickness preferably in the range of 0.01 to 30 μm, and more preferably in the range of 0.05 to 5 μm. When the thickness is smaller than 0.01 μm, a defect of the membrane may easily occur to cause decrease in separation performance. When the thickness is larger than 30 μm, the permeation rate of the membrane permeating material gets low and thus the time for the membrane separation may be delayed. Herein, the thickness of the zeolite membrane is an average value obtained by observing a cross-section of the zeolite membrane using a scanning electron microscope (SEM).

The method for producing a DDR type zeolite membrane is not limited particularly as long as a dense DDR type zeolite membrane can be formed. For example, as described in a method for producing a DDR type zeolite membrane disclosed in JP-A 2003 2003-159518, there is a method for producing a DDR type zeolite membrane including: carrying out a hydrothermal synthesis using a raw material solution and DDR type zeolite powder, in which a content ratio of 1-adamantanamine to silica (1-adamantanamine/$SiO_2$) is in the range of 0.03 to 0.4 in terms of molar ratio, a content ratio of water to silica (water/$SiO_2$) is in the range of 20 to 500 in terms of molar ratio, and a content ratio of ethylenediamine to 1-adamantanamine (ethylenediamine/1-adamantanamine) is in the range of 5 to 32 in terms of molar ratio.

As shown in FIG. 1, the DDR type zeolite membrane 2 is disposed on the outer surface of the porous substrate 47. Even though the zeolite membrane is formed into a thin membrane as the DDR type zeolite membrane is disposed on the surface of the porous substrate, the DDR type zeolite membrane is supported to the substrate to keep the shape thereof and thus it is possible to prevent the DDR type zeolite membrane from being damaged. The porous substrate is not limited particularly as long as the porous substrate is porous and can form a zeolite membrane. The material, shape, and size may be appropriately determined according to the uses or the like. As the material constituting the substrate, there are ceramics such as alumina ($\alpha$-alumina, $\gamma$- alumina, anodized alumina), zircona, metal such as stainless, and the like, and the alumina is advantageous from the viewpoint of production of the substrate and easy availability. Alumina obtained by forming and sintering alumina particles having an average diameter of 0.001 to 30 μm is advantageous. The porous substrate may have any one of shapes, plate, cylinder, sectional polygon tube, and monolith.

A raw material tank (not shown) for reserving the mixture 31 and a pump (not shown) may be installed on the outside of the separation container 1 so that the mixture 31 circulates between the separation container 1 and the raw material tank. A preheating device (not shown) for preheating the mixture 31 or a pressurizing device (not shown) may be disposed between the separation container 1 and the raw material tank.

(2-2) Collector (Trap)

As shown in FIG. 1, the collector 14 is connected preferably to a depressurizing nozzle (union 10) of the separation container 1 by the depressurizing pipe 16, and to the depressurizing device 15 by the depressurizing pipe 16. With such a configuration, at the time of the separation operation, it is possible to depressurize the inside of the collector 14 through the depressurizing pipe 16 by operating the depressurizing device 15, and it is possible to depressurize the inside (permeation side space 22) of the inner cylinder 6 of the separation container 1 through the collector 14 the depressurizing pipe 16 up to a predetermined pressure. When the supply side space 21 is pressurized to the air pressure or higher and it is not necessary to depressurize the permeation side space 22, the depressurizing device 15 may be not necessary. When it is not necessary to collect the membrane permeating materials 32, the collector 14 and the cold tube 17 may be not necessary.

The collector 14 is made of preferably a material that can stand against pressure at the time of the depressurizing operation. For example, there are glass, stainless, and the like as the material. The structure of the collector 14 is not limited to the shape of the collector 14 shown in FIG. 1 as long as the collector can collect the membrane permeating materials upon depressurizing the inside (permeation side space 22) of the inner cylinder 6 of the separation container 1 up to a predetermined pressure. In FIG. 1, there are provided a cylindrical (both of upper portion and lower portion are closed) collector body having a depressurizing nozzle formed on the side thereof, and an insertion tube that is inserted from one end of the collector body to the inside of the collector body and communicates between the outside and the inside of the collector body. As shown in FIG. 1, since the collector 14 cools the flowing-in vapor of the membrane permeating materials to collect the materials, the collector 14 is disposed preferably in a cold tube 17 filled with liquid nitrogen 35 that is a refrigerant. The refrigerant is not limited particularly as long as the membrane permeating materials 32 can be collected by the collector 14, and may be appropriately selected according to pressure in the collector. For example, ice water, water, dry ice (solid carbon dioxide), ethanol (or acetone, methanol), liquid argon, and the like may be used as the refrigerant, in addition to liquid nitrogen. A container made of glass, stainless, or the like may be used as the cold tube 17.

(2-3) Depressurizing Device

The depressurizing device 15 for depressurizing the inside (permeation side space 22) of the inner cylinder of the separation container is not limited particularly as long as the permeation side space 22 can be depressurized up to a predetermined pressure or lower. In this case, the depressurization includes decrease in partial pressure of the membrane permeating materials 32 in the permeation side space 22. To control the pressure in the permeation side space 22, a pressure controller is installed preferably at the depressurizing pipe 16 between the depressurizing device 15 and the collector 14. However, the pressure controller may be installed at the collector 14, at the depressurizing pipe 16 between the collector 14 and the separation container 1, or at the separation container 1.

(3) Membrane Reactor

A membrane reactor of the present invention includes: a reactor that includes a porous substrate, a DDR type zeolite membrane disposed on the surface of the porous substrate, and a reactor body defined into a space (reaction side space) of one side of the DDR type zeolite membrane disposed on the surface of the porous substrate and a space (permeation space) of the other side thereof; and a depressurizing device that depressurizes the permeation side space of the reactor, a pressurizing device that pressurizes the reaction side space of the reactor, or both of the depressurizing device and the pressurizing device. The membrane reactor further includes preferably a collector that collects materials permeating from the reaction side space through the DDR type zeolite membrane to the depressurization side space by depressurizing the permeation side space.

The above-described dehydration apparatus of the present invention is preferably used as the membrane reactor of the present invention. In the case that the dehydration apparatus of the present invention is used as the membrane reactor of the present invention, the separation container, the container body, and the supply side space of the dehydration apparatus of the present invention are preferably used as a reactor, a reactor body, and a reaction side space, respectively.

Accordingly, the dehydration apparatus 100 of the present invention shown in FIG. 1 is used as the membrane reactor, the supply side space 21 is used as the reaction side space, and a raw material for reaction is put instead of the mixture 31. In the case that water is generated by the reaction, the permeation side space 22 is depressurized, the generated water is allowed to permeate the DDR type zeolite membrane 2, and thus the water is collected by the collector 14.

Reaction suitable for using the membrane reactor of the present invention is, for example, esterification reaction using carboxyl acid and alcohol as a raw material, etherification reaction using alcohol as a raw material, or the like. Since these reactions are dehydration reaction, water is generated by the reaction. For this reason, to raise a yield of the reaction-generated material such as ester by the reaction, it is necessary to remove water out of a reaction system. Since the membrane reactor of the present invention can selectively remove water from the reaction system, the membrane reactor is used preferably for such esterification reaction or the like.

As esterification reaction, for example, there are reaction between acetic acid and ethanol, reaction between lactic acid and ethanol, reaction between acetic acid and methanol, reaction between formic acid and methanol, reaction between formic acid and ethanol, and the like. As etherification reaction, for example, there are dimethyl etherification reaction from methanol, diethyl etherification reaction from ethanol, ethyl methyl etherification reaction from methanol and ethanol, and the like.

EXAMPLES

Hereinafter, the present invention will be described in more detail with reference to Examples, but the present invention is not limited to Examples at all.

Example 1

(Production of DDR Type Zeolite Membrane)

(1) Preparation of Membrane Forming Sol Solution:

The figure 6.21 g of ethylenediamine (produced by Wako Pure Chemical Industries, Ltd.) was put in a 100 ml jar made of fluorine resin, and 0.98 g of 1-adamantanamine (produced by Aldrich, Ltd.) was added thereto, thereby dissolving it so that no precipitate of 1-adamantanamine remains. The figure 53.87 g of water was put in the other beaker, 22.00 g of 30 mass % silica sol (Snowtex S, produced by Nissan Chemical Industries, Ltd.) was added thereto, it was stirred slightly, it is added into the jar in which ethylenediamine and 1-adamantanamine were stirred, and it was shaken and stirred strongly. Then, the jar was set on a shaker and additionally shaken at 500 rpm, thereby producing a raw material solution. At that time, a 1-adamantanamine/silica ratio was 0.0589, a water/silica ratio was 0.94, and an ethylenediamine/1-adamantanamine ratio was 16.

(2) Formation of Zeolite Membrane

DDR type zeolite fine powder was applied to a porous alumina tube as a porous substrate for forming a membrane having a diameter of 12 mm and a length of 40 mm, it was disposed in a pressure resistant container made of stainless having an inner cylinder made of fluorine resin with an inner volume of 100 ml. Then, the raw material solution was poured into the pressure resistant container, and a heat treatment (hydrothermal synthesis) was carried out at 150° C. for 16 hours. After the heat treatment, a DDR type zeolite membrane was formed on the surface of the substrate. After water cleaning and drying, the temperature thereof was raised up to 750° C. at a rate of 0.1° C./min by an electric furnace, it was kept for 4 hours, and it was cooled up to a room temperature at a rate of 1° C./min.

(Separation Container)

As shown in FIG. 1, the thermometer 8 and the cooling tube 7 were inserted into the lid 5 of the container body 3 having the lid 5 and the based cylindrical container 4 with a volume of 500 ml. The inner cylinder bottom 13 made of glass was attached to one end of the porous substrate 47 having the DDR type zeolite membrane 2 formed thereon, the inner cylinder (glass tube) 6 was connected to the other end, and the glass tube 6 and the depressurizing pipe 16 were connected to each other by the union 10. In the state where the inner cylinder bottom 13 was placed in the container body 3 and the glass tube 6 was inserted into the rubber stopper 11, it was disposed in the lid 5 (container body 3). A magnetic stirrer 9 was put in the container body 3.

(Separation Device of Mixture)

The separation apparatus 100 was manufactured as shown in FIG. 1. That is, the obtained separation container 1 was put in the heat medium container 12 filled with the heat medium 33 as shown in FIG. 1, and thus the temperature control was possible. Water was used as the heat medium 33. As shown in FIG. 1, the collector 14 and the depressurizing device 15 were prepared, the glass tube 6 of the separation container 1 and the depressurizing pipe 16 were connected to each other by the union 10 made of stainless, the collector 14 was connected by the depressurizing pipe 16, and the collector 14 and the depressurizing device 15 are connected to each other by the depressurizing pipe 16. A trap produced by Ohkura Riken Co., Ltd. was used as the collector 14, and an oil rotary vacuum pump (G20DA) was used as the depressurizing device 15. The collector 14 was disposed in the based cylindrical cold tube 17 filled with liquid nitrogen 35 as a refrigerant, to cool and collect vapor of the flowing-in membrane permeating materials.

(Separation Operation 1)

As shown in FIG. 1, an ethanol 90 vol % water solution (mixture 31) was put in the inside (supply side space 21) of the cylindrical container 4 of the separation container 1. Then, while the mixture 31 was stirred by the stirrer 9, the mixture 31 was heated by the heat medium 33 so that the temperature thereof was 75° C., and the inside (permeation side space 22) of the inner cylinder 6 was depressurized to 10 Pa or lower. The membrane permeating materials 32 were collected by the collector 14. The obtained membrane permeating materials were analyzed in the following manner. The analysis result is shown in Table 1. In Table 1, "permeability" denotes the total amount of the membrane permeating materials, "separation coefficient" denotes (A component concentration of permeating material/B component concentration of permeating material)/(A component concentration of mixture/B component concentration of mixture).

(Analysis of Membrane Permeating Materials)

Analyzer: Gas chromatograph manufactured by HP Co., Ltd.

Product Name: HP6090

Analysis Method: Gas chromatography

Detector: TCD

TABLE 1

| Mixture Composition (A Component: B Component = A Concentration: B Concentration) | Temperature [° C.] | Permeability [kg/m²h] | Separation Coefficient |
|---|---|---|---|
| Ex. 1 water:ethanol = 10:90 (vol %) | 75 | 0.85 | 1100 |
| Ex. 2 water:methanol = 10:90 (mass %) | 50 | 1.30 | 2.6 |

TABLE 1-continued

| Mixture Composition (A Component: B Component = A Concentration: B Concentration) | Temperature [° C.] | Permeability [kg/m²h] | Separation Coefficient |
|---|---|---|---|
| Ex. 3 water:acetone = 10:90 (mass %) | 50 | 0.67 | 550 |
| Ex. 4 water:acetic acid = 32:68 (mass %) | 75 | 1.49 | 338 |
| Ex. 5 water:isopropanol = 10:90 (mass %) | 50 | 0.56 | 309 |

Examples 2 to 5

Except that mixture compositions and separation temperatures were changed as shown in Table 1, the same operation as Example 1 was carried out, and permeation performance of the mixture by the DDR type zeolite membrane was examined. The obtained result is shown in Table 1.

Example 6

(Separation Operation 2)

The separation operation in the ethanol 90 vol % water solution shown in Example 1 was performed. Then, in the DDR type zeolite membrane on which the separation operation in the acetic acid 68 mass % water solution shown in Example 4 was carried out, the separation operation in the ethanol 90 vol % water solution was carried out according to the operation manner shown in Example 1. According to this, acid resistance of the DDR type zeolite membrane was assessed. The obtained result is shown in Table 2.

TABLE 2

| Mixture Composition (A Component: B Component = A Concentration: B Concentration) | Temperature [° C.] | Permeability [kg/m²] | Separation Coefficient |
|---|---|---|---|
| Ex. 6 water:ethanol = 10:90 (vol %) | 75 | 0.82 | 1700 |

Example 7

(Separation Operation 3)

Figure 2:
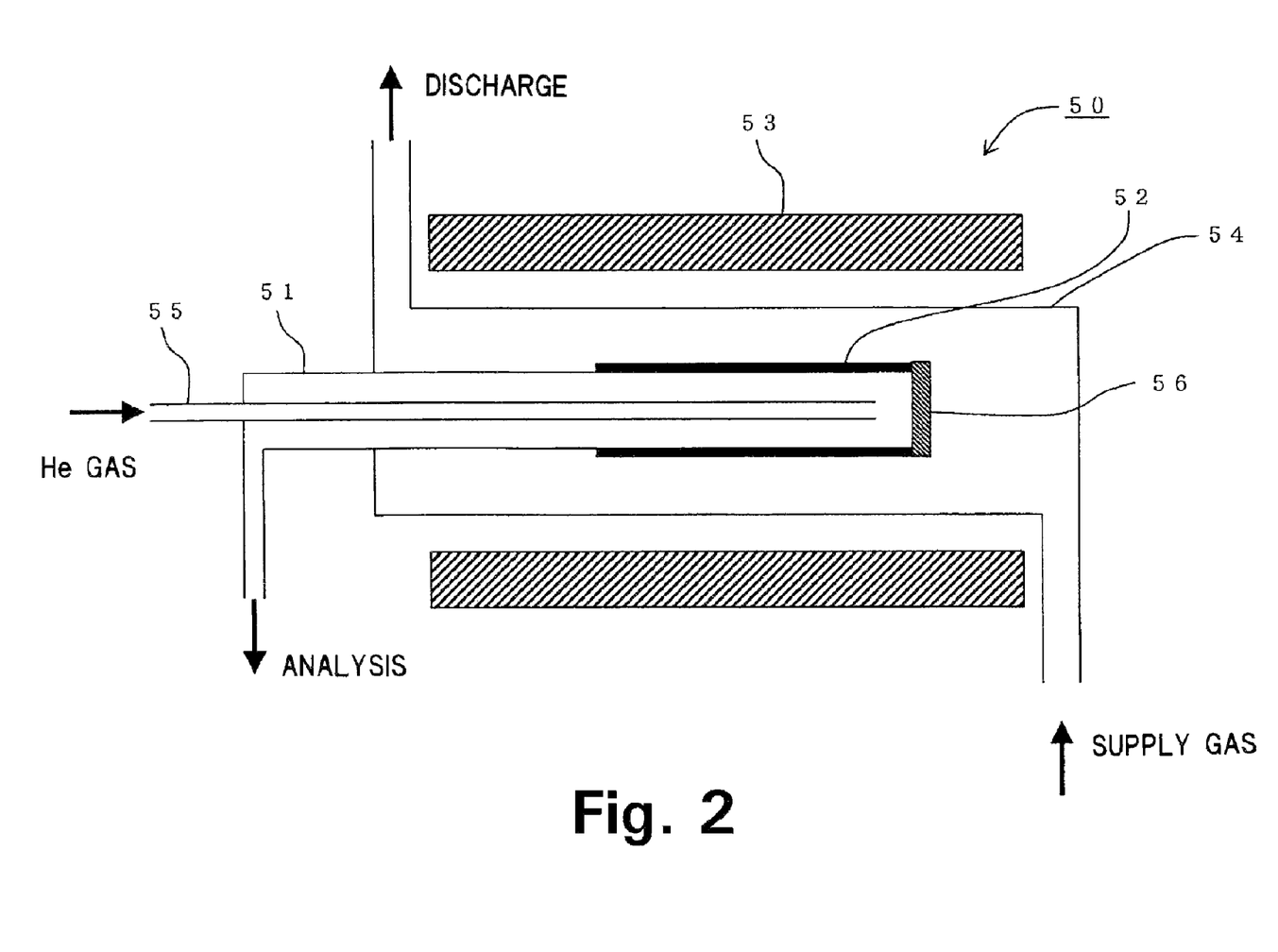
FIG. 2 is a schematic diagram illustrating a configuration of a gas separation tester used for a separation operation in the embodiment.

The separation operation was carried out using the DDR type zeolite membrane produced in the same manner as Example 1. FIG. 2 is a schematic diagram illustrating a configuration of a gas separation tester 50 used in the separation operation, which shows that the DDR type zeolite membrane 52 is attached to a measurement tube 51 (inner diameter of 15 mm) made of alumina, a front end thereof is closed by an alumina cap 56, it is put in a furnace core tube 54 (inner diameter of 25 mm) of a tube furnace, and a quartz tube 55 having an inner diameter of 6 mm is allowed to pass through the inside of the measurement tube 51 up to the vicinity of the front end of the DDR type zeolite membrane 52, thereby forming a triple tube structure. A saturated vapor of water at 25° C. as the supply gas was introduced to the outside (supply side space of DDR type zeolite membrane) of the measurement tube 51, together with carbon dioxide at 100 ml/min. The temperature of the DDR type zeolite membrane was kept at 60° C. by heating of the tube furnace 53, and He gas (sweep gas, 100 ml/min) for decreasing partial pressure of the membrane permeating materials that permeates the DDR type zeolite membrane 52 was allowed to flow in the quartz tube 55 of the inside (permeation side space of DDR type zeolite membrane) of the measurement tube 51. The water-containing gas that permeated the DDR type zeolite membrane 52 was divided, the gas was analyzed by gas chromatograph, and the permeation coefficient of water (mol/m$^2$/Pa/s) was assessed. The coefficient of water was $3.48 \times 10^{-7}$ (mol/m$^2$/Pa/s). A saturated vapor of methanol at 25° C. as the supply gas was introduced together with carbon dioxide. In the same manner as the case of water, the permeation coefficient of methanol was $2.00 \times 10^{-8}$ (mol/m$^2$/Pa/s). When using these permeation coefficients, the ideal separation coefficient of water/methanol was 17.4. Herein, the ideal separation coefficient is a ratio of a permeation coefficient of a single component. Since separation manners, supply concentrations, and temperatures are various, simple comparison cannot be used. However, water exhibited a characteristic to easily permeate the DDR type zeolite membrane as compared with methanol, similarly with Example 2.

As can be seen from Table 1, according to the dehydration methods of Examples 1 to 5, water can be selectively separated from the mixture of water and alcohol or the mixture of water and organic acid. Attention is paid to molecular diameters of water, organic solvent, and organic acid used in Examples. The molecular diameter means a kinetic diameter. The molecular diameter of water is 0.265 nm, and the molecular diameters of methanol, ethanol, acetone, acetic acid, and isopropanol are 0.38 nm, 0.43 nm, 0.469 nm, 0.436 nm, and 0.47 nm, respectively. The diameter of the pores of the DDR type zeolite is 0.36×0.44 nm. Water easily permeates the diameter of the pores of the DDR type zeolite membrane, but any one of organic solvents and organic acids such as, for example, ethanol, acetone, acetic acid, and isopropanol hardly permeate the pores of the DDR type zeolite since they have diameters equal to or larger than the diameters of the pores of the DDR type zeolite. For this reason, it seems that very high separation coefficients were represented as shown in Examples 1, and 3 to 5. However, since the molecular diameter of methanol is smaller than that of the other organic solvent and organic acid and relatively easily permeates the pores of the DDR type zeolite, it seems that a little low separation coefficient was represented as shown in Example 2. As can be seen from Table 2, even after the separation operation in the acetic acid 68 mass % water solution was carried out, that is, the immersion into the acetic acid 68 mass % water solution which is an acid solution having pH 2 or less was carried out, the DDR type zeolite membrane kept the separation performance. From Example 7, even when the mixture was supplied in a gas state, water tends to more selectively permeate the DDR type zeolite membrane than the organic solvent. Therefore, the state of the mixture is not limited particularly.

INDUSTRIAL APPLICABILITY

The present invention is a dehydration method, which may be used as a method for separating water from a water-containing mixture, and particularly, by which it is possible to separate water from a mixture without the need of a high energy cost, in which the separation membrane has high acid resistance in a separation process and the separation performance is hardly affected depending on a hydrophilic or hydrophobic property.

The invention claimed is:

1. A dehydration method by which water is selectively separated from a water-containing mixture with a separation membrane that is a DDR type zeolite membrane, the dehydration method using pervaporation or vapor permeation comprising: bringing the mixture into contact with one side of the DDR type zeolite membrane, wherein the mixture is a liquid containing an organic compound at ambient temperature and pressure; and causing a pressure difference between a supply side of the DDR type zeolite membrane which is in contact with the mixture and a permeation side of the DDR type zeolite membrane, to thereby cause the water to selectively permeate and separate out, wherein a pressure on the permeation side is lower than that on the supply side, and (i) when pervaporation is used, a pressure of the permeation side of the DDR type zeolite membrane is in a range of $1 \times 10^{-1}$ to $1 \times 10^4$ Pa, and (ii) when vapor permeation is used, a pressure on the permeation side of the DDR type zeolite membrane is in a range of $1 \times 10^{-2}$ to $5 \times 10^4$ Pa.

2. The dehydration method according to claim 1, wherein the mixture is a liquid containing an organic compound.

3. A dehydrating apparatus for performing dehydration using pervaporation or vapor permeation comprising:
   a separation container that includes a porous substrate, a DDR type zeolite membrane disposed on the surface of the porous substrate, and a container body defined into a supply side on one side of the DDR type zeolite membrane disposed on the surface of the porous substrate and a permeation side on the other side thereof; and
   at least one of a depressurizing device that depressurizes the permeation side space of the separation container and a pressurizing device that pressurizes the supply side space of the separation container,
   wherein a liquid mixture containing an organic compound at ambient temperature and pressure is brought into contact with the supply side of the DDR type zeolite membrane, the separation container is placed in a heat medium container filled with a heat medium and heated gas in the separation container is cooled by a cooling tube, wherein a pressure on the permeation side is lower than that on the supply side and (i) when pervaporation is used, a pressure on the permeation side of the DDR type zeolite membrane is in a range of $1 \times 10^{-1}$ to $1 \times 10^4$ Pa, and (ii) when vapor permeation is used, a pressure on the permeation side of the DDR type zeolite membrane is in a range of $1 \times 10^{-2}$ to $5 \times 10^4$ Pa.

4. The dehydrating apparatus according to claim 3, further comprising a collector that collects materials permeating from the supply side space through the DDR type zeolite membrane to the permeation side space.

5. A membrane reactor for performing dehydration using pervaporation or vapor permeation comprising:
   a reactor that includes a porous substrate, a DDR type zeolite membrane disposed on the surface of the porous substrate, and a reactor body defined into a reaction side on one side of the DDR type zeolite membrane disposed on the surface of the porous substrate and a permeation side on the other side thereof; and
   at least one of a depressurizing device that depressurizes the permeation side of the reactor and a pressurizing device that pressurizes the reaction side of the reactor,
   wherein a liquid mixture containing an organic compound at ambient temperature and pressure is brought into contact with the reaction side of the DDR type zeolite membrane, the reactor is placed in a heat medium container filled with a heat medium and heated gas in the reactor is cooled by a cooling tube, wherein a pressure on the permeation side is lower than that on the reaction side and (i) when pervaporation is used, a pressure on the permeation side of the DDR type zeolite membrane is in a range of $1\times10^{-1}$ to $1\times10^{4}$ Pa, and (ii) when vapor permeation is used, a pressure on the permeation side of the DDR type zeolite membrane is in a range of $1\times10^{-2}$ to $5\times10^{4}$ Pa.

6. The membrane reactor according to claim 5, further comprising a collector that collects materials permeating from the reaction side space through the DDR type zeolite membrane to the permeation side space.

* * * * *